Nov. 29, 1949  L. P. FRIEDER ET AL  2,489,632
CABLE GRIPPING DEVICE
Filed Oct. 16, 1946  5 Sheets-Sheet 1

INVENTORS
LEONARD P. FRIEDER
WALTER S. FINKEN
BY
George F. Des Marais
ATTORNEY

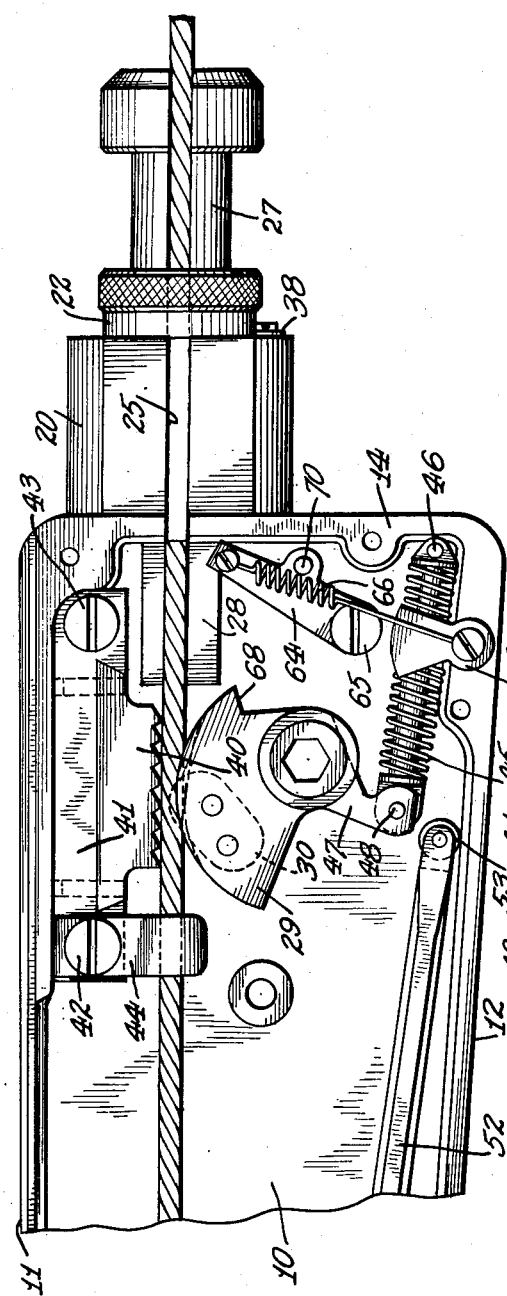

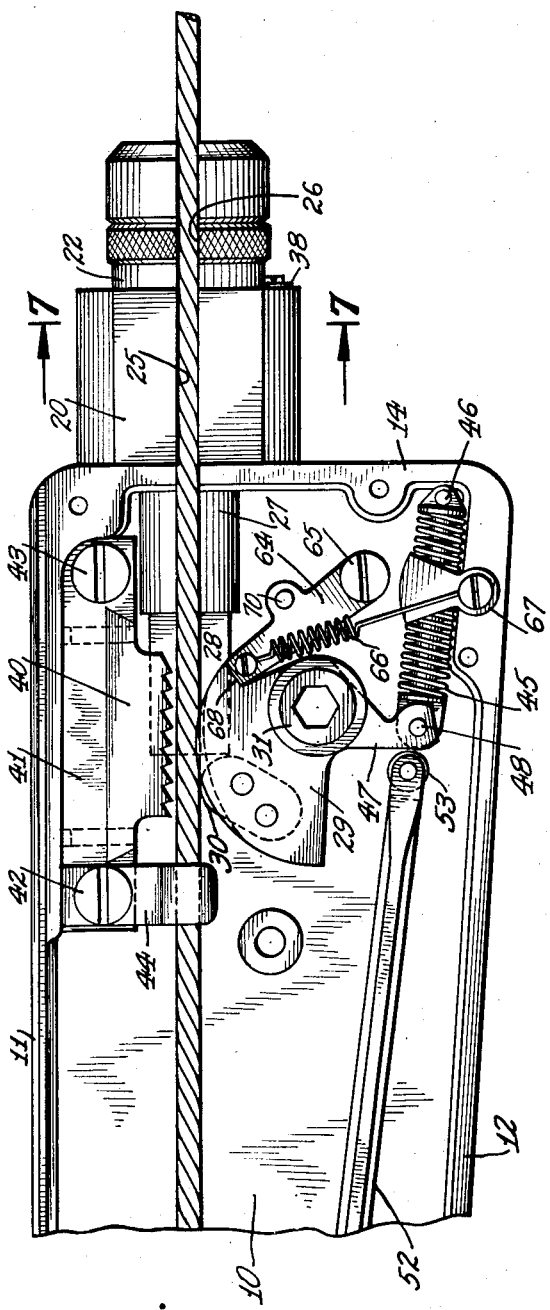

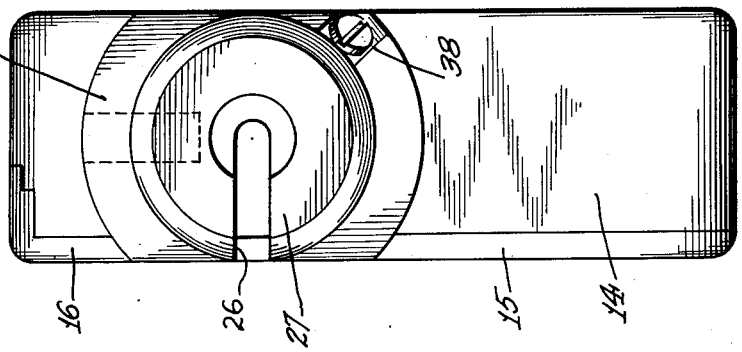
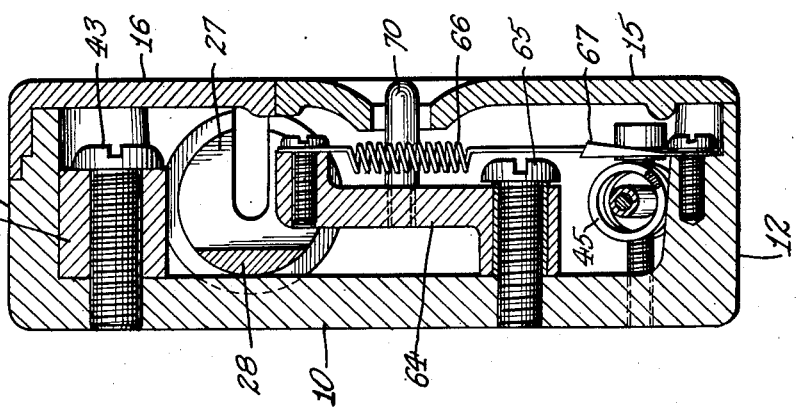
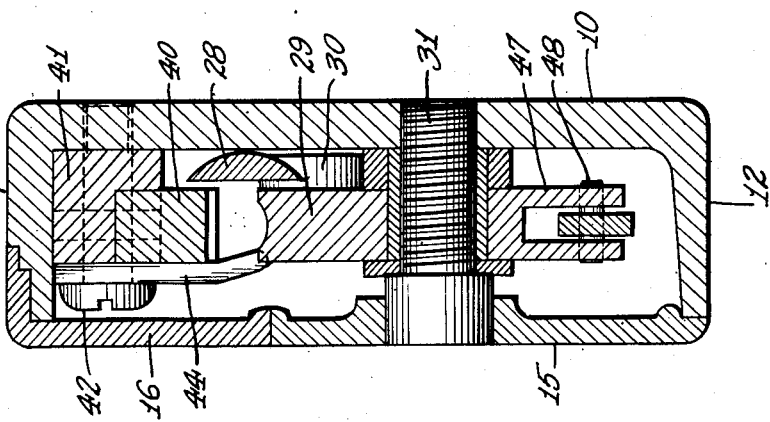

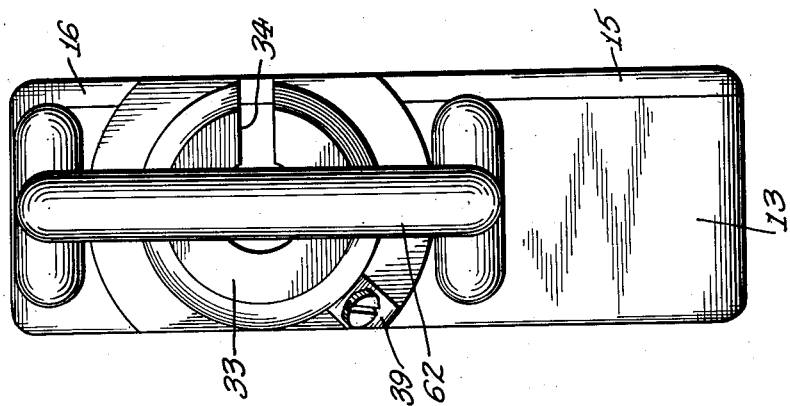
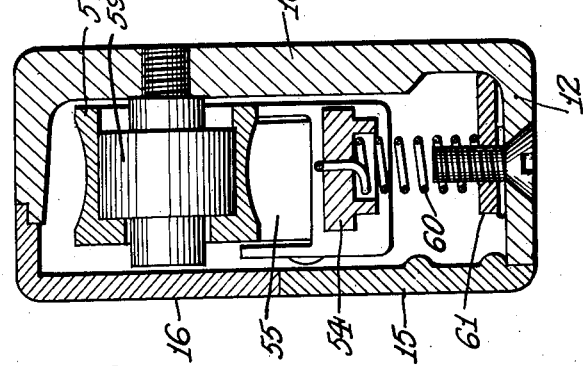
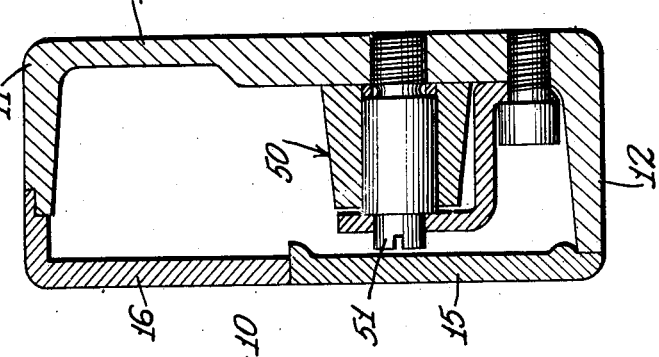
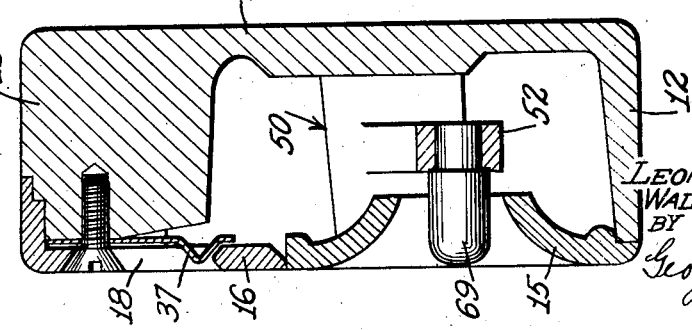

Patented Nov. 29, 1949

2,489,632

UNITED STATES PATENT OFFICE 2,489,632

CABLE GRIPPING DEVICE

Leonard P. Frieder, Great Neck, and Walter S. Finken, Brooklyn, N. Y.; said Finken assignor to said Frieder Application October 16, 1946, Serial No. 703,638

8 Claims. (Cl. 273—105.3)

This invention relates to devices for automatically gripping a cable short of its end. Among the objects of the invention is to provide a device adapted to slide along an extended cable and automatically to attach itself directly to the cable close to its end.

Another object of the invention is to provide a cable gripping device constructed and arranged for effecting the release of the device from a cable to which it is attached.

An important application of the invention is found in its use for towing and releasing targets and for attaching targets to the end of a tow line. Targets are usually towed at considerable distance from a towing aircraft. As targets are consumed or destroyed it becomes desirable to replace the target by another one, and considerable time can be saved if a new target can be attached to a tow line without having to take up the tow line. It sometimes happens that the tow line is itself severed and it is an attainment of the present invention to provide a cable gripping device that can be slid along an extended tow line and caused to grip the cable short of its free or broken end. The device is provided with a shackle or other connection by which a target is fastened thereto and is so constructed as to be placed upon an extended line in such a manner as to utilize the extended line as a trolley for conveying the device along its length. The device has a trigger mechanism which is maintained in a cocked condition by the line passing through the device. When the device reaches the end of the line the cocked condition of the trigger is upset and jaws are immediately brought into action to seize upon the line. Jaw releasing mechanism is employed in conjunction with a plunger which may be operated by a weighted messenger or by a second cable gripping device when it is desired to release the device from the cable and replace the released target.

Other objects of the present invention will be hereinafter set forth in the accompanying specification and claims and demonstrated by the drawings which show by way of illustration a preferred embodiment of the principle of the invention and the best mode in which we have contemplated applying that principle.

In the drawings, Fig. 1 is an outside view of a gripping device embodying the present invention;

Fig. 4 illustrates the gripping mechanism seizing the cable after the trigger has been tripped;

Fig. 5 illustrates the gripping mechanism latched in retracted position as when the device is passing from the end of the cable;

Fig. 6 illustrates the device and a cable with the cable gripping jaws latched in a non-functionable position;

Fig. 7 is a section on line 7—7 of Fig. 6;

Fig. 8 is a longitudinal section on the vertical axis of Fig. 7;

Fig. 9 is an end view of the device as seen from line 9—9 of Fig. 1;

Fig. 10 is a sectional view on line 10—10 of Fig. 2;

Figure 2:
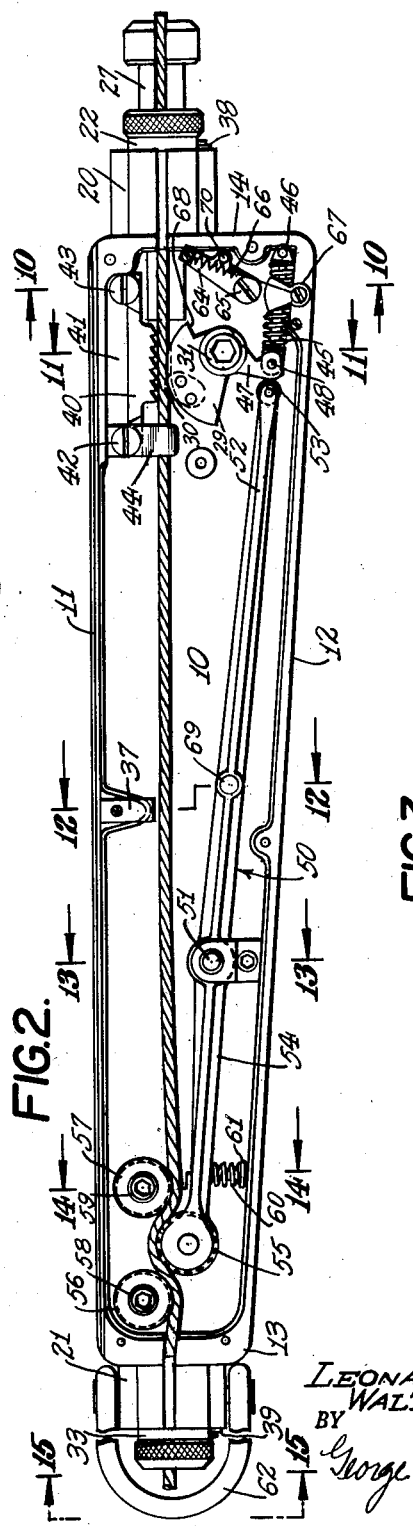
Fig. 2 is a view of the device shown in Fig. 1 with the cover plates removed and illustrating the gripping device ready for descent along a cable.
Figure 3:
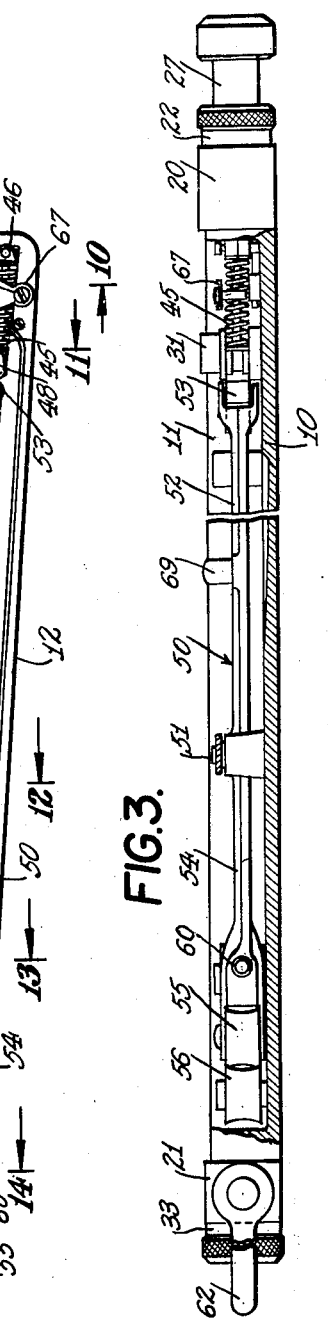
Fig. 3 is a side view of the device with a side wall broken away.

Figs. 11, 12, 13 and 14 are sectional views taken on lines 11—11, 12—12, 13—13 and 14—14 respectively, of Fig. 2; and Fig. 15 is an end view of the device as seen from line 15—15 of Fig. 2.

As illustrated in the drawings the body member of the device is so constructed as to contain the operating mechanism and provisions for slidably supporting the device on a line or cable. While the body member may be in the form of an open frame or other body capable of suspending a load from a cable, we have found it convenient to construct the same as an enclosure including a main wall 10, side walls 11 and 12, end walls 13 and 14 and detachable cover plates 15 and 16. After the working parts have been assembled it is unnecessary to remove the cover 15 which is attached to the body member by means of screws. Cover plate 16 is also attached to the body member by means of screws which pass through elongated slots 17, 18 and 19 which provide for sliding the cover plate laterally to permit threading the device onto an extended cable. Each end wall 13 and 14 has extending therefrom a boss 20 and 21.

Boss 20 is bored to receive a bushing 22, as shown in detail in Figs. 7 and 8. The bushing is held within the boss by a pin 23 which engages a lateral slot 24 of sufficient length to allow partial rotation of the bushing to close off the longitudinal slot 25 in boss 20 so as to confine a cable within the boss. Bushing 22 is slotted at 26 to provide a clear passageway for the cable when the cable is inserted in slot 25 for applying the device to a cable. The cable-receiving position of bushing 22 is illustrated in Figs. 1, 6 and 7, and the closed position of the bushing is illustrated in Figs. 2, 4 and 5.

Within bushing 22 there is disposed the shank of a plunger 27 which carries at its inner end a projection 28 by which a cam 29 of the cable gripping mechanism is relieved from cable-engaging position as shown in Fig. 5. The projection 28 is disposed in line with a lug 30 attached to the cam so that when the plunger and its projection are forced inwardly from the position shown in Figs. 2 and 4, the projection will contact the lug and rotate the cam counter-clockwise to the position illustrated in Fig. 5. Cam 29 is pivotally mounted upon a bearing 31. Plunger 27 is longitudinally slotted at 32, Fig. 8, to limit the travel of plunger 27 in a longitudinal direction, the slot being so proportioned to accommodate pin 23 which is fixed in boss 20.

Boss 21 at the other end of the device is bored to rotatively support a bushing 33 which is provided with a slot 34 extending to each end of the bushing. Bushing 33 is connected to boss 21 by a pin and slot connection (not shown) which is so arranged as to permit rotary displacement of the bushing to place slot 34 out of alignment with slot 35 in boss 21 as shown in Fig. 2.

Figure 1:
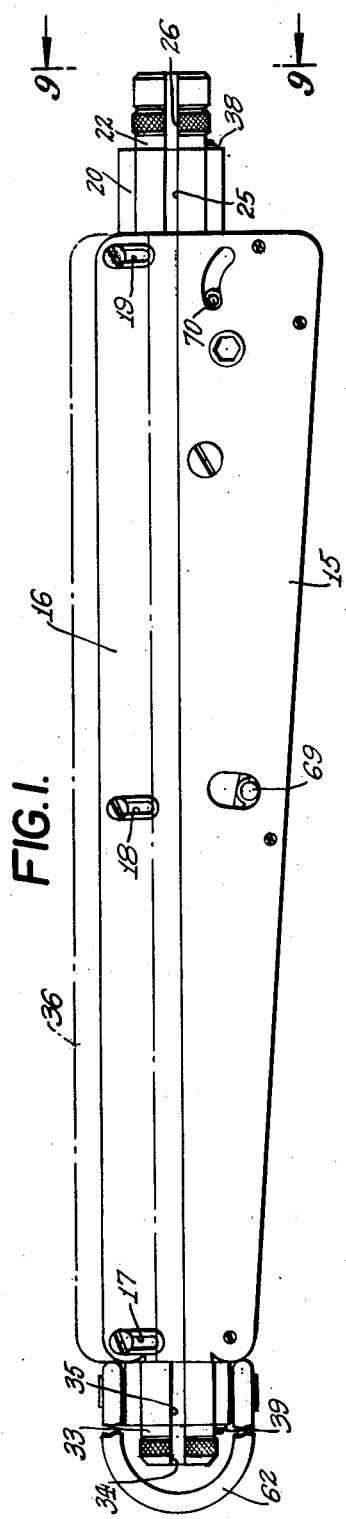

In applying the device to an extended cable, the end bushings are disposed so as to locate the slots 26 and 34 in alignment with slots 25 and 35 of bosses 20 and 21 and cover 16 is laterally displaced, as indicated by broken lines 36 in Fig. 1, to accommodate the cable. Spring 37, which normally holds cover 16 in place, can be sprung to unlatch the cover. The aligned slots of the bushings and bosses are illustrated in Fig. 1. After the device has been applied to an extended cable, bushings 22 and 33 are given a quarter turn to enclose the cable in the manner illustrated in Fig. 2. Cantilever springs 38 and 39, secured to bosses 20 and 21, respectively, engage notches in the bushings when the bushings have been rotated to enclose the cable.

When the device is applied to a cable and is readied for sliding down the cable as shown in Fig. 2, the cable extends freely between serrated surfaces forming teeth on cam 29 and a fixed jaw 40. Jaw 40 is mounted on a block 41 attached to the body member 10 by means of screws 42 and 43. A guard 44 is so located as to assure that the cable runs between the opposing teeth. Spring 45 is for rotating cam 29 clockwise for causing seizure of the cable between the cam and the jaw 40. Spring 45 is mounted on a pair of telescoping rods, one of which is pivotally anchored to a pin 46 and the other of which is pivotally attached to an arm 47 of the cam by a pin 48.

As illustrated in Fig. 2, the cam is held from engagement with the cable by means of a trigger comprising a lever 50 fulcrumed on a pin 51 and having an arm 52 carrying a roller 53 which engages arm 47 of the cam when the trigger is set for action. The second arm 54 of the lever carries a roller 55 which is disposed between rollers 56 and 57. Rollers 56 and 57 are mounted upon bearings 58 and 59 supported from the rear wall 10 of the body member. A spring 60 normally biases lever 50 in a clockwise direction. When the device is applied to a cable the cable is threaded over the rollers so as to lie between rollers 56 and 57 on one side and roller 55 on the other side in the manner illustrated in Fig. 2. The cable is slightly crimped between rollers 56 and 57 by the pressure exerted by roller 57 due to the pressure of spring 60. The lever is disposed in set position by the cooperating effects of the cable and the trigger spring. In such position of the lever, roller 53 on arm 52 is so located as to bear against arm 47 of cam 29 and thereby restrain the cam from actuation by spring 45. A plate 61 at the base of spring 60 may be adjusted to bring this about for applying the device to any particular cable.

With the cable threaded through the device and sleeves 22 and 33 positioned to enclose the cable, the device is free to slide along the cable under the pull of gravity, but when the supporting effect of the length of cable between rollers 56 and 57 is terminated, the trigger will rotate clockwise under the influence of spring 60 and free cam 29 to the action of spring 45. This occurs almost immediately the end of the cable passes roller 56. Upon relief of the cam from support of arm 52, cam 29 rotates clockwise, as shown in Fig. 4, and causes seizure of the cable between the teeth on the cam and the teeth on the fixed jaw 40 and the immediate arrest of the descent of the device along the cable.

The lower end of the device is provided with a shackle 62 for the attachment of a target. When it is desired to cast aside an attached device and suspended target, it is necessary to disengage the jaws from seizure with the cable. This may be accomplished by a weighted messenger 63 which is allowed to descend along the towing cable and strike plunger 27 for accomplishing this result, trigger lever 50 having previously been rocked clockwise under the influence of spring 60 because of lack of support for roller 55.

Plunger 27 is normally extended from the device by the action of a spring-biased detent 64 which is pivoted on a pin 65 and has a spring 66 by which the detent is maintained in a position to the left or right of dead center. Spring 66 is prevented from fouling spring 45 by a shield 67. In the position of the detent shown in Figs. 2 and 4, detent 64 bears against the end of the cylindrical shank of plunger 27 and holds it extended. When the messenger 63 strikes the head of plunger 27 the plunger is moved inwardly and projection 28 is brought into contact with lug 30 and actuates cam 29 in a counter-clockwise direction. Concurrently detent 64 is pivoted over its dead center by plunger 27 and is rotated by its spring 66 to a position behind shoulder 68 of the cam, thereby locking the cam in an open position, as shown in Fig. 5. The cable is then free to pass from the gripping device.

If the released device is to be replaced by a second similar device carrying a new target, the second device is applied to the cable in the manner previously described. If cam 29 is not already inactivated by engagement with detent 64, as shown in Fig. 5, this can be accomplished by hand pressure applied to piston 27 to effect rotation of the cam counter-clockwise and position detent 64 behind shoulder 68 of the cam. Trigger 50 is then rocked against spring 60 by application of pressure to finger piece 69 and the device is placed and secured on the cable with the cable running through the bosses 20 and 21. The trigger is then allowed to set itself with spring 60 urging roller 55 against the length of cable between rollers 56 and 57. Thereafter detent 64 is rocked clockwise by finger pressure applied to pin 70, from cam-engaging position, Fig. 6, to its retracted position, Fig. 2. As this is done the cam is permitted to bear upon and be supported solely by the trigger. The device, with an attached target, is then ready to be released to slide down the cable.

What is claimed is:

1. A device of the character described comprising a body member, means for supporting said body member in sliding relation with respect to a cable passing therethrough, means for gripping said cable, spring means operable on said cable-gripping means for actuating the same to cable-gripping position, a trigger, means cooperating with said trigger and said cable for setting said trigger to hold said cable-gripping means in a cocked position, said trigger-setting means comprising means adapted to engage the cable for thereby supporting the trigger in set position, and means for actuating said trigger to release said cable-gripping means to the action of said spring means when said trigger ceases to cooperate with and be supported by said cable.

2. A device of the character described comprising a body member, means for supporting said body member in sliding relation with respect to a cable passing therethrough, means for gripping said cable, spring means operable on said cable-gripping means for actuating the same to cable-gripping position, a trigger, means cooperating with said trigger and said cable for setting said trigger to hold said cable-gripping means in a cocked position, said trigger-setting means comprising means adapted to engage the cable for thereby supporting the trigger in set position, means for actuating said trigger to uncock said cable-gripping means when said trigger ceases to cooperate with and be supported by said cable, means for disengaging said cable-gripping means from engagement with said cable, and means for holding said cable-gripping means in disengaged position.

3. A device of the character described, comprising a body member, cable guide means, one located at each end of said body member for guiding a cable extending therethrough, cable-gripping means carried by said body member, spring means for actuating said cable-gripping means, a trigger pivotally mounted intermediate the ends of said body member, said trigger having an arm adapted to restrain said cable-gripping means against the action of said spring means, second spring means acting upon said trigger for pressing said trigger against the cable extending through said body member whereby said trigger is held by said cable and is released to the action of said last-named spring means when said cable is removed from engagement with said trigger, whereupon said trigger is rocked and releases said cable-engaging means to seize said cable.

4. A device of the character described comprising a body member, cable guide means, one located at each end of said body member for guiding a cable extending therethrough, a jaw attached to said body member adjacent one end, a cam pivotally mounted opposite said jaw, spring means for rocking said cam, a trigger pivotally mounted intermediate the ends of said body member, said trigger having an arm adapted to engage said cam and hold it against the action of said spring means, a second spring means acting upon said trigger and together with the cable extending through said body member holding said trigger in cam-engaging position whereby said trigger may be released to the action of said last-named spring means when said cable is removed from engagement with said trigger, whereupon said trigger is rocked from cam-engaging position and the cam and jaw are caused to seize upon said cable.

5. A device of the character described comprising a body member, means for guiding a cable extending through said body member, a jaw attached to said body member adjacent one end, a cam pivotally mounted opposite said jaw, spring means for rocking said cam to hold said cable against said jaw, a detent adapted to engage said cam to hold it out of operative position, a trigger pivotally mounted intermediate the ends of said body member and carrying means for engaging a cable extending through said body member, said cable-engaging means being disposed relative to the cable and trigger so that when said cable-engaging means is engaging said cable, said trigger is positioned to prevent operation of said cam and so that when said cable is removed from engagement with said cable-engaging means said trigger is rocked and said cam is freed to seize said cable between itself and said jaw, and means adapted to displace said cam from cable-seizing position and to rock said detent to engage said cam.

6. A device of the character described comprising a body member, means for guiding a cable through said body member, a jaw attached to said body member adjacent one end, a cam pivotally mounted opposite said jaw, spring means adapted to rock said cam to engage said cable between said cam and said jaw, a pair of spaced rollers adjacent the other end of said body member for engaging the cable, a trigger pivotally mounted intermediate the ends of said body member and carrying a roller disposed opposite the space between the rollers of said pair of rollers, said trigger having an arm adapted to engage said cam and hold it in cocked position against the action of said spring means, a second spring means for biasing said trigger to urge the roller carried thereby into engagement with the length of cable extending between said pair of rollers whereby said length of cable retains said trigger in cam engaging position and said trigger is displaced by said second spring means to release said cam when the end of said cable passes from engagement with said rollers, whereupon the released cam is actuated by said first-named spring means and is caused to engage the cable between itself and said jaw.

7. A device of the character described comprising a body member, means for supporting said body member in sliding relation with respect to a cable passing therethrough, means for gripping upon said cable, spring means for urging said gripping means into cable-engaging position, a trigger adapted to bear upon said gripping means for holding the same out of engagement with said cable, said trigger having an arm bearing a roller adapted to rest upon said cable, means supporting a length of said cable against the pressure of said trigger, said last-named means including a pair of spaced members carried by said body member, a spring acting upon said trigger for pressing said roller against the length of cable between said pair of spaced members, whereby when said length of cable is withdrawn from coaction with said spaced members, said trigger is actuated to release said cable-gripping means to the action of the first-mentioned spring means.

8. A device for gripping a cable comprising a body member adapted to be slidably engaged by a cable extending therethrough, said body member having a central compartment and grooved bosses at each end through which the cable extends, slotted bushings rotatably mounted in said bosses for enclosing the cable within the grooves in said bosses, means secured to the boss at one end of said body member for attaching a target, jaws mounted at the other end of said body member, spring means for operating at least one of said jaws to seize a cable, a jaw-releasing lever pivotally mounted in said compartment, means carried by said lever for engaging a cable extending through said compartment whereby said lever is disposed by coaction with said cable in a position to hold said movable jaw out of cable-seizing position, spring means adapted to rock said lever when said cable is withdrawn from coaction with said lever, the aforesaid first-mentioned spring means being adapted to actuate said movable jaw upon the release of said jaw by said lever, whereby said movable jaw is moved to seize upon said cable and prevent its total withdrawal from said compartment, and means for displacing said movable jaw from cable-seizing position to release said body member from engagement with said cable.

LEONARD P. FRIEDER.
WALTER S. FINKEN.

REFERENCES CITED

The following references are of record in the file of this patent:

UNITED STATES PATENTS

| Number | Name | Date |
|---|---|---|
| 1,921,627 | Lucchesi | Aug. 8, 1933 |
| 2,196,938 | Parnell | Apr. 9, 1940 |
| 2,386,137 | Olsson et al. | Oct. 2, 1945 |